US008674650B1

(12) United States Patent
Rabinovich

(10) Patent No.: US 8,674,650 B1
(45) Date of Patent: Mar. 18, 2014

(54) METHOD FOR CONTROLLING OF AN AC INDUCTION MOTOR

(75) Inventor: Ilya Rabinovich, Tel Aviv (IL)

(73) Assignee: Ilya Rabinovich, Tel Aviv Jafo (IL)

( * ) Notice: Subject to any disclaimer, the term of this patent is extended or adjusted under 35 U.S.C. 154(b) by 522 days.

(21) Appl. No.: 12/317,915

(22) Filed: Dec. 31, 2008

(30) Foreign Application Priority Data

Jan. 20, 2008 (IL) .......................... 188885

(51) Int. Cl.
H02P 1/26 (2006.01)

(52) U.S. Cl.
USPC ............................ 318/779; 318/376; 318/434

(58) Field of Classification Search
USPC ............ 318/779, 376, 434, 400.02, 609, 807, 318/623, 628, 400.01, 727, 400.09, 798
See application file for complete search history.

(56) References Cited

U.S. PATENT DOCUMENTS

| 4,161,772 | A  | * | 7/1979  | Moerman | ................... | 363/44  |
| 6,380,708 | B1 |   | 4/2002  | Gritter  |                     |         |
| 2008/0131289 | A1 | * | 6/2008  | Koehl   | ................... | 417/32  |
| 2009/0264249 | A1 | * | 10/2009 | Gloge   | ................... | 477/3   |

FOREIGN PATENT DOCUMENTS

WO    WO 00/77919  A1    12/2000

* cited by examiner

Primary Examiner — Karen Masih

(57) ABSTRACT

A method is provided for controlling of an AC induction motor by starters realizing transient conditions of desired quality nevertheless changing conditions of a power supply and a motor charge. The method for controlling a starting and stopping is based on step-by-step changing of a power consumption of the motor in a moment, defined on every step. When transient conditions of now in use step reach near equilibrium conditions or impermissible transient conditions, it is the moment for changing characteristics of current supplied to the motor. The method for controlling the starting and the stopping is used for controlling a rotation speed of the motor. A regulator, which produces its control signal with accordance to an algorithm control of the rotation speed, defines direction of changing motor power consumption. Addition conditions prevent negative interaction of the speed control and the starting or stopping control.

16 Claims, 19 Drawing Sheets

1 – Voltage, V;
2 – Current, A;
3 – Speed of change of voltage, SV=dV/dt;
4 – Speed of change of current, SA=dA/dt.

1 − Voltage, V;
2 − Current, A;
3 − Speed of change of voltage, SV=dV/dt;
4 − Speed of change of current, SA=dA/dt.

1 – Voltage, V;
2 – Current, A.

3 - Speed of change of voltage, SV=dV/dt;
4 - Speed of change of current, SA=dA/dt.

1 – Voltage, V;
2 – Current, A.

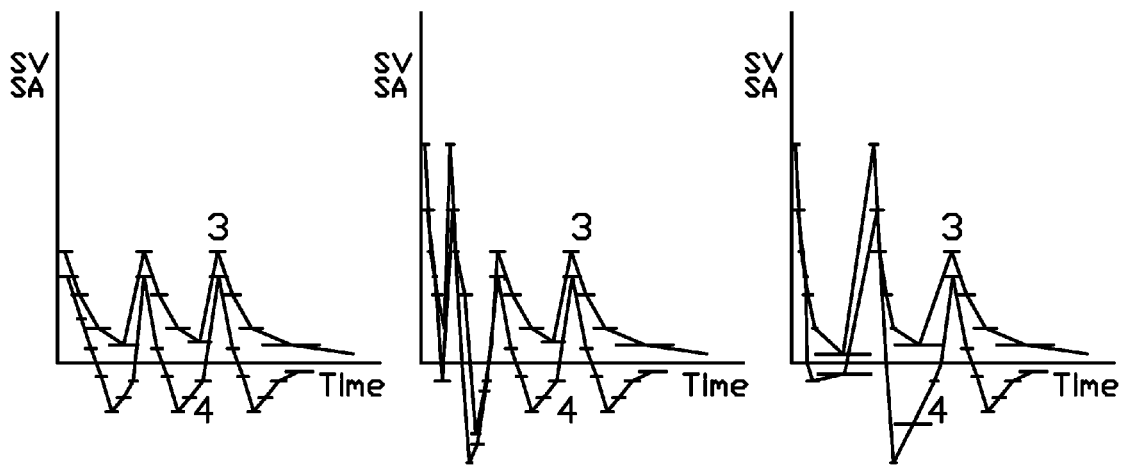
3 – Speed of change of voltage,
   SV=dV/dt;
4 – Speed of change of current,
   SA=dA/dt.

METHOD FOR CONTROLLING OF AN AC INDUCTION MOTOR

FIELD OF THE INVENTION

This invention relates to motor control, in particular, to a method of controlling a starting and stopping of an AC induction motor by step-by-step changing characteristics of electric current supplied to the motor and also to a method of controlling motor rotation speed on base of the method controlling of the starting and stopping.

BACKGROUND OF THE INVENTION

Starting of an AC induction motor produces an inrush current in windings of the motor. Magnitude of the inrush current is 5-10 times greater than nominal current.

Base method to make inrush current lower is to limit power, which the motor is able to receive during starting period, so that to make possible desired starting process. AC induction motor starters are used to change characteristics of electric current supplied to the motor for realizing desired starting.

It is sometimes necessitated that a stop process of the motor will be within definite characteristics, for example, smooth or slow stopping.

In starters used in modern industry: star-delta starter, autotransformer starters, some types of soft starters change of characteristics of electric current supplied to an AC induction motor is fulfilled by steps. Moments of step changing as a rule are predetermined. In some cases the moments are defined during start process.

It is known method of controlling an induction motor and apparatus thereof (PCT WO 00/77919 A1 from 21 Dec. 2000), which based on reference values that are set according to characteristics of an induction motor by user, controlling currents inputted to induction motor and comparing the currents and reference values to discriminate a trip conditions of induction motor. Among reference and control parameters are driving current value, peak current value, delay time period and Y-starting time period. Reference parameters are introduced in controller and corrected when operating mode is manual to compensate motor parameters changing. They are used by controller, when operating mode is automatic.

Y-starting time period introduced and corrected in controller, when operating mode is manual, does not react on changes in supplied to motor voltages and charge of the motor, when operating mode is manual or automatic in future starts.

A method is provided for controlling the starting of an AC induction motor with a soft starter (U.S. Pat. No. 6,380,708, from 30 Apr. 2002). The windings are connected in a delta configuration and each winding has a corresponding thyristor switch connected in series therewith such that each winding and thyristor switch combination is connected between two corresponding terminals of the AC induction motor. Alpha control of the thyristor switches is utilized to start the AC induction motor and bring the AC induction motor to near full operating speed. As the AC induction motor nears full operating speed, gamma control of the thyristor switches is utilized to bring the AC induction motor to full operating speed.

The method include steps: repeating for a predetermined time period the steps of calculating a new alpha firing angle and sequentially firing each thyristor switch; upon completion of the predetermined time period, sequentially firing each thyristor switch at a user selected alpha firing angle after occurrence of zero volts supplied by the AC input source; and monitoring motor current in the AC induction motor and if the motor current is greater than a predetermined value, repeating the step of sequentially firing each thyristor switch at a user selected alpha firing angle. New alpha firing angle is calculated according to the initial firing angle, integral of the monitored motor current over a conduction time interval and a user selected preset current limit.

In soft starter it is possible to change firing angle every half period. In the discussed invention it is selected to work at least predetermined time period with the same firing angle and time of firing at each user selected firing angle equals one or some predetermined time periods depending of relations between integral of the monitored motor current over a conduction time interval and reference parameter—a user selected preset current limit. Step difference of user selected firing angles also depends from these parameters.

It is necessary to say that motor current is not enough suitable parameter for selection of motor starting step duration because the current depends of parameters of power supply, motor and charge. In conditions of low level of power supply and big charge even large motor current will be only enough to rotate motor with existing low speed without acceleration. Prolongation of starting with such power level increases starting time.

This is a list of mostly used methods of power consumption changing in start or stop process of an AC induction motor:
1. Changing connection of motor windings. In case of three windings, the change of winding connection from star to delta configuration increases motor power consumption three times.
2. Changing voltage of power supply to an AC induction motor, for example, by changing transformation ratio of transformer used in power controller.
3. Changing time of power supply to an AC induction motor by some type of modulation. Here is phase modulation, which uses in thyristor switches, pulse-time modulation in solid state relays and etc.
4. Changing motor current, for example, the rotor current by means of changing of resistors in circuit of phase rotor in motor with collector.

Each step of starting is characterized with changing of motor power consumption, higher at beginning and lower at end of the step. This motor power consumption depends of parameters of power supply, motor and charge.

Power controller output defines power level limit, which the motor may reach in definite conditions on each step. It is possible only to establish relationship between power level limits of the steps in identical conditions and to give to each step a number in increasing or decreasing row of power level limits.

Number of power level limits and a magnitude of each power level limit or defined by power controller construction as in case of star-delta starter or transformer starter, and consist of limited number of power level limits. In case of soft starter larger number of power level limits may be chosen before or during starting for more smooth process.

If number of changing of power level limits and magnitude of each power level limit are definite, an optimal sequence of time periods of selected power level limits may be found for each starting condition. Changing of power level limits in shorter time intervals brings to increasing of start current. Prolonged time intervals between changes of power level limits are resulted in prolongation of start period with current greater than nominal current.

However, the conditions of each motor start are changing from start to start because of changing of motor charge, voltage of AC source, temperature, aging of motor and starter and so on. Power, received by an AC induction motor at the same power level limit may be in different cases sufficient or insufficient to produce breakaway torque or acceleration. If load can be changed during start process, the same one step changing of power level limit increases or does not increase the speed of motor rotation. The last case may be realized when increase of load needs greater torque increase than the motor possible to produce after a stepped changing of power level limit.

So, as the result of changing start conditions, AC induction motors starts as a rule or with increased current, or with prolonged start time, or with both phenomena.

For fulfilling desired start of an AC induction motor we need, at first, to supply power, which can produce breakaway torque, and further to add power, which increases speed of motor rotation on each step so, that transient conditions will be reasonable or desired.

Therefore, it is a primary object and feature of present invention to provide an improved method for controlling of an AC induction motor.

It is a primary object and feature of present invention to provide an improved method for controlling the starting and stopping of an AC induction motor in stable manner.

It is a primary object and feature of present invention to provide an improved method for controlling rotation speed of an AC induction motor.

It is still a primary object and feature of present invention to provide an improved method for controlling an AC induction motor, which utilizes traditional and less expensive components.

SUMMARY OF THE INVENTION

Start process of an AC induction motor with stepped changed power level limit is a transient phenomenon from unmoving position, when AC current source disconnected from the motor, to equilibrium condition of rotating motor, when AC current source connected to the motor directly. This transient phenomenon consists of step transient modes. Each step transient mode finishes at nearly stable equilibrium positions at end of step transit processes or, on the contrary, at conditions, which are at such great distance of this step equilibrium positions or desired transition conditions that it is preferable to return to previous step of power level limit. Number of step transit modes equal to number of steps of power limit changes during start process.

Changing of the power level limits at near equilibrium condition has also advantage of low current magnitude in moments of fulfilling this changing.

Such approach may be also used for stopping rotated AC induction motor with desired transition conditions. Stop process of an AC induction motor with stepped changed power level limit possible to see as transient phenomenon with some step transient modes. It begins at equilibrium condition of rotating motor, when an AC current source connected to the AC induction motor, performs by step decreasing of power level limit and ends, when the AC current source disconnects from the AC induction motor. Each of step transient modes is finished when the moment and direction of changing of power level limit are defined. If it is defined, that step transient mode is near equilibrium condition in stop process, the power level limit will be decreased. If it is defined, that the conditions of step transient mode propose returning to previous step of power level limit, such definition in stop process will be used to increase the power level limit.

In some cases it is necessary to stabilize motor rotation speed at near nominal motor conditions. It is economically preferable, that a starter will be used for this purpose.

Control circuit, which fulfills desired start of AC induction motor by step-by-step changing power level limit, needs information for decision to finish now in use step.

It is necessary to select independent variables as parameters, which define transient conditions for control start process. Between the variables are motor power, effective voltage, effective current, power factor, rotation speed and working torque. Voltage and current, rotation speed and working torque are pairs of the parameters, which characterize motor power.

All sort of power, active, reactive and apparent, at end of transition condition are near constant values when motor is near equilibrium condition and there is not capacitance in winding circuits. In this case all sort of power may be used to define near equilibrium condition. Otherwise, active power must be used.

The most useful method of induction motor start is to change effective voltage on motor terminals. It is reasonable to select one of the next pairs to control transient conditions of motor starting process: effective phase voltage and effective current of motor windings, effective phase voltage and motor power, effective phase voltage and motor rotation speed.

Changing of effective voltage mainly contents information of changing of power level limit and changing of another controlled parameter characterizes transient conditions produced by this changing.

Dynamic behavior of the parameters is different. Common for all of them is the fact that speed of changing of each parameter is low and its absolute magnitude decreases at end of step at near equilibrium condition. The speed of changing of effective phase voltage at the beginning of step is greater than the speed of changing of other parameters. The low speed of changing of effective values of phase voltage may be an indicator that it is time to control if the speed of another chosen parameter lower or greater than desired speed of changing of this parameters.

On practice, speed of change of parameter changing may be controlled by difference of parameter through small constant interval of time, on which the time is divided. Because of parameter noise it is necessary to use average magnitude of speed of change of parameter.

Next definitions are used in preferred embodiments:

an initial speed of change of parameter as an average value of speed of change of the parameter for chosen averaging period of time from the moment of changing of power level limit;

a last speed of change of parameter as an average value of speed of change of the parameter for the last averaging period of time when this period is finished;

a preset speed of change of parameter as the value of speed of change of the parameter, which is used for defining if a value of last speed of change of parameter is such that it is necessary to change power level limit;

a preset increasing speed of change of parameter as the value of preset speed of change of parameter, which is used for defining if a value of last speed of change of parameter is such that it is necessary to increase the power level limit;

a preset decreasing speed of change of parameter as the value of preset speed of change of parameter, which is used for defining if a value of last speed of change of parameter is such that it is necessary to decrease the power level limit;

an additional preset increasing speed of change of parameter is the value of preset increasing speed of change of the parameter in now in use power level limit after choice of a step lower power level limit, when fulfilling start process;

an additional preset decreasing speed of change of parameter is the value of preset decreasing speed of change of the parameter in now in use power level limit after choice of a step greater power level limit, when fulfilling stop process.

Construction of motor starter as it is considered in preferred embodiments includes:

device physically changing parameters of source electric current to electric current, supplied to an AC induction motor—electric current transducer, device controlling changing of source electric current—changer of power level limit, device controlling moments of electric current changing—moment controller.

Electric current transducer is a device included into power electric circuit, which allows produce different power level limits. The power electric circuit of star-delta starter includes motor windings and power contacts of contactors, which are possible to realize star or delta configuration of motor stator windings. The power electric circuit of starter with transformer, which includes primary and secondary windings of transformer and power contacts of contactors, and which is possible to produce different power level limits by selection needed transformer ratio or configuration of connections of the windings. The power electric circuit of soft starter including thyristors with devices controlling opening of thyristors is possible to produce power level limits according to selected values of firing angle in case of phase angle control or firing time and interval in case of multi-cycle control.

Changer of power level limit is a part of control circuit, which realizes possibility of electric current transducer to produce different power level limits and allows change power level limits in desired direction when receives controlling signal. The changer of star-delta and transformer starters includes corn and coils of contactors and all other elements controlling current through the coils of contactors. The changer of soft starter is a part of the control circuit, which changes firing angle in case of phase angle control or firing time and/or interval in case of multi-cycle control.

Moment controller is a device included in control circuit or its algorithm, which produces signal to increase or decrease power level limit on base of analog or digital analyzing of results of measuring of motor controlled parameters. The moment controller of traditional star-delta and transformer starters with timers is a part of timers, which change state of output contacts of timers. The output contacts of timers included in the changer. The moment controller of soft starter is an algorithm of control, which defined the moment of changing of firing angle in case of phase angle control or firing time and/or interval in case of multi-cycle control.

Control circuit and moment controller are, practically, included in common electronic PCB. However, it is preferable in description of this invention to use two devices: control circuit and moment controller.

Objects, features and advantages of the present invention defined in clams will become clearer when the drawings as well as the detailed description of the drawings are taken into consideration.

BRIEF DESCRIPTION OF THE DRAWINGS

The drawings furnished herewith illustrate a preferred construction of the present invention, in which the above advantages and features are clearly disclosed as well as others. The advantages and features will be readily understood from the following description of the illustrating embodiment.

In the drawings:

FIGS. 5A, 5B, 5C, 5D, 5E and 5F is graphical representations of effective voltage across and effective current through windings and speeds of change of the voltage and the current as a function of time during three steps AC induction motor difficult starting, without using and in accordance with the method of the present invention;

DETAILED DESCRIPTION OF THE DRAWINGS

Figure 1A:
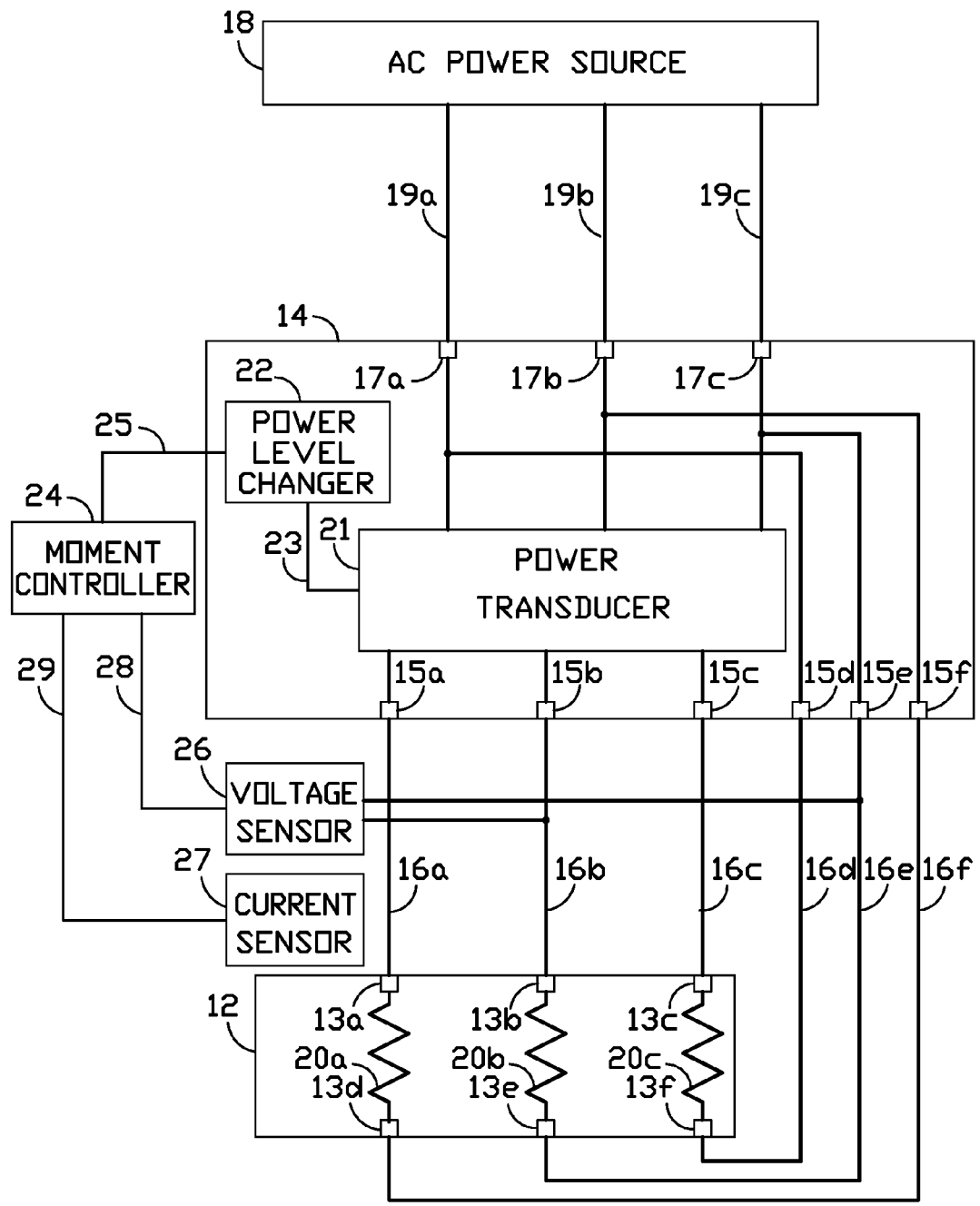
FIGS. 1A, 1B, 1C and 1D are schematic diagrams of common motor system for executing a method of motor starting and stopping, in accordance with the present invention.

FIGS. 1A, 1B, 1C and 1D define motor systems with measuring of effective voltage and effective current as another parameter using for realizations of a method of motor starting and stopping of the invention.

On FIGS. 1A, 1B, 1C and 1D are shown motor systems for executing the method in accordance with the present invention. Motor control system includes an AC induction motor 12, which with terminals 13a, 13b, 13c, 13d, 13e and 13f is coupled to power controller 14 through its output terminals 15a, 15b, 15c, 15d, 15e and 15f by lines 16a, 16b, 16c, 16d, 16e, 16f. Input terminals 17a, 17b and 17c of power controller 14 connect to a three-phase AC source 18 by lines 19a, 19b and 19c. As it is conventional, AC source 18 provides line voltages $V_A$, $V_B$ and $V_C$ and line currents $I_A$, $I_B$ and $I_C$ through corresponding supply lines 19a, 19b and 19c to power controller 14. The phase voltages $V_a$, $V_b$ and $V_c$ between taps of motor windings 20a, 20b and 20c and phase currents $I_a$, $I_b$ and $I_c$ through windings 20a, 20b and 20c of motor 12 for different power level limits are produced by transducer 21. Transducer 21 connects to changer of power level limit 22, which controls transducer 21, by line 23. Changer of power level limit 22 connects to moment controller 24 by line 25. Moment controller 24 controls the moments of power level changes. Moment controller 24 takes information from voltage sensor 26 and current sensor 27. Voltage sensor 26 and current sensor 27 are connected to moment controller 24 by lines 28 and 29.

FIGS. 1A, 1B, 1C and 1D define also realization of method of motor starting and stopping of the invention with measuring of effective voltage and motor rotation speed or motor power as another parameter besides effective current. In these cases position 27 designate speed sensor or power sensor.

Figure 1B:
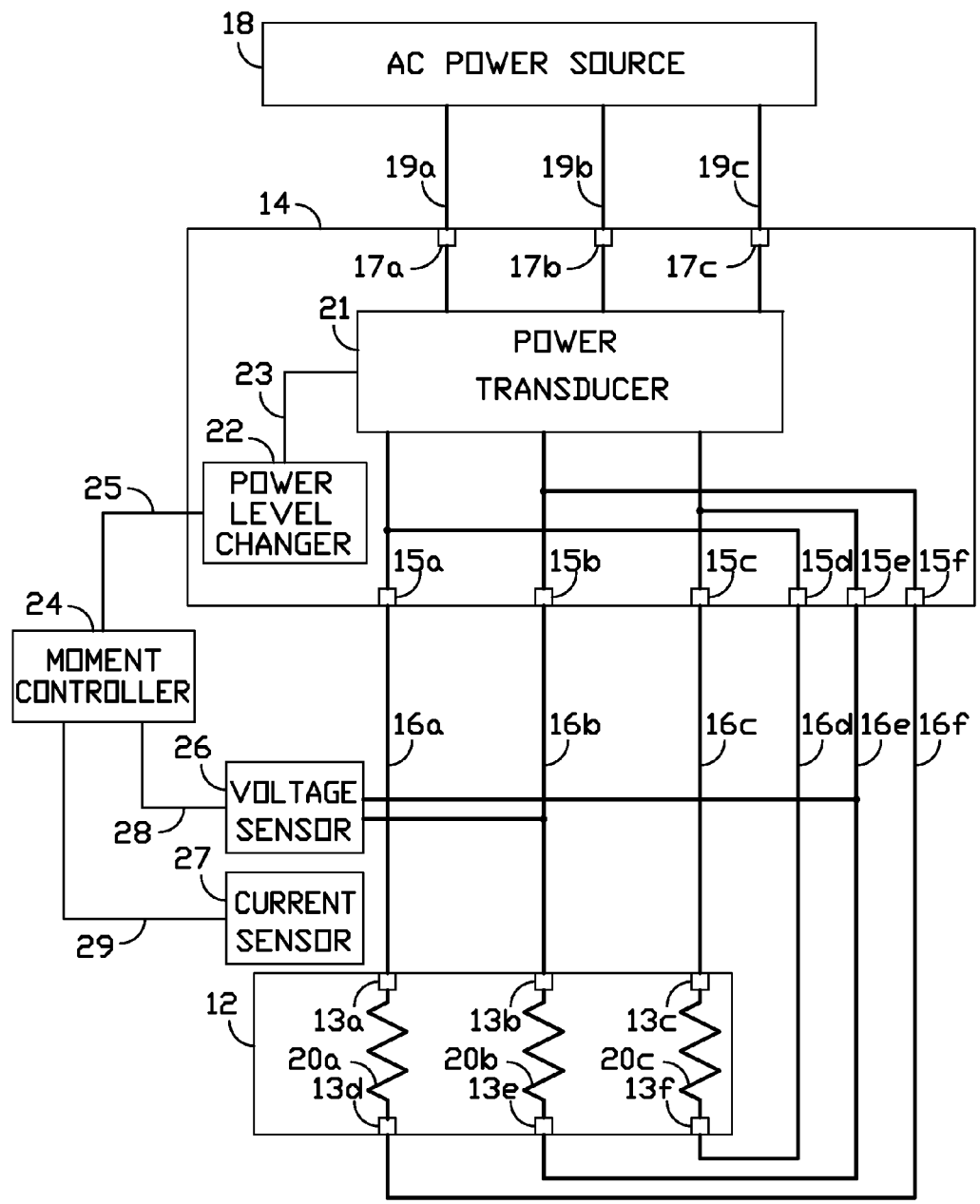
Figure 1C:
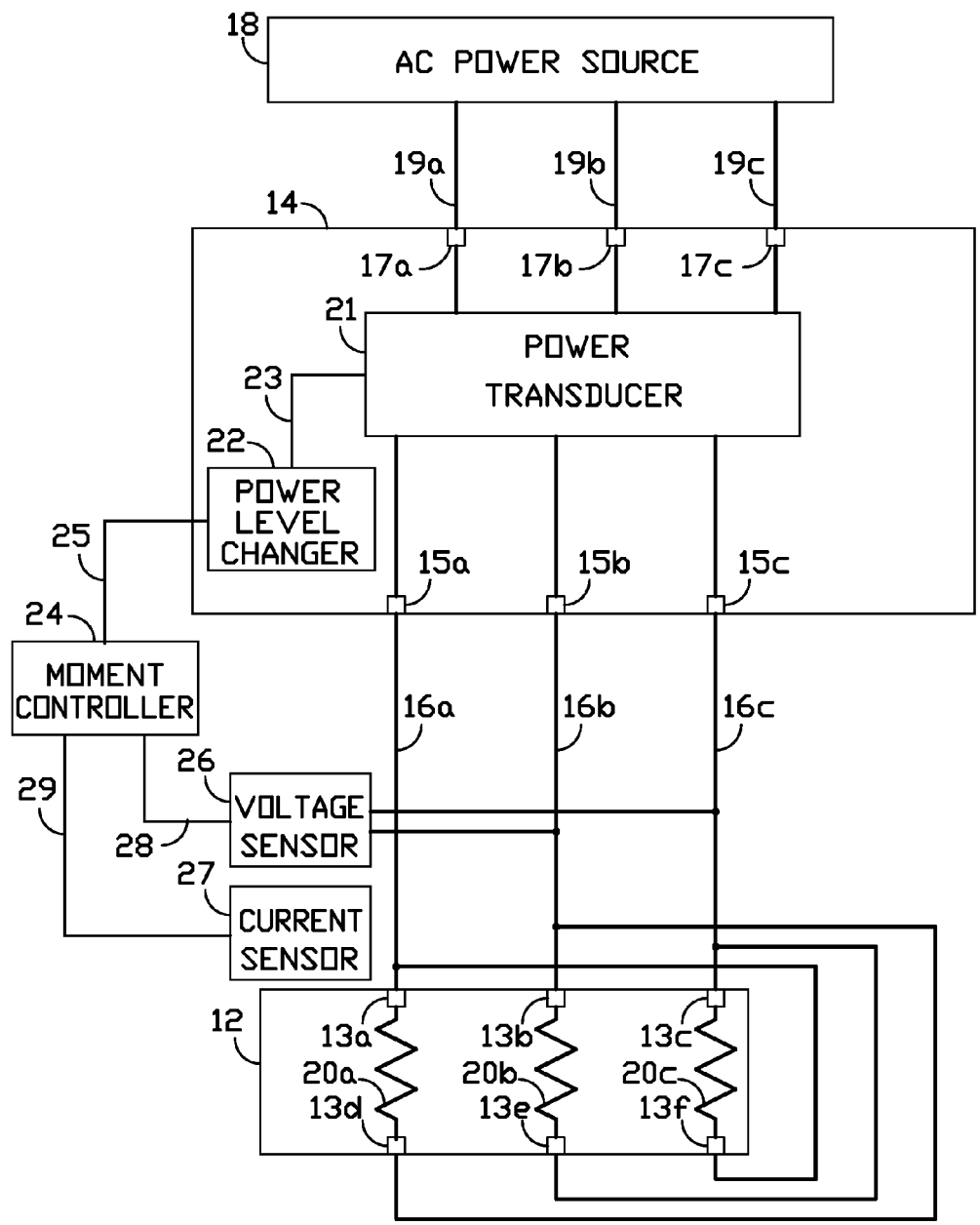

Using the connection of all terminals of AC induction motor to power controller makes possible to connect motor windings of utilized power controller 14 so that transducer will be within delta configuration of motor windings, FIG. 1A, or out of it, FIG. 1B. The invention may be used in both cases. The invention may be also used in case, when only three wires connect power controller and motor, which windings are in delta configuration, because of functional dependence of phase voltage and current out and within delta configuration of motor windings, FIG. 1C.

Figure 1D:
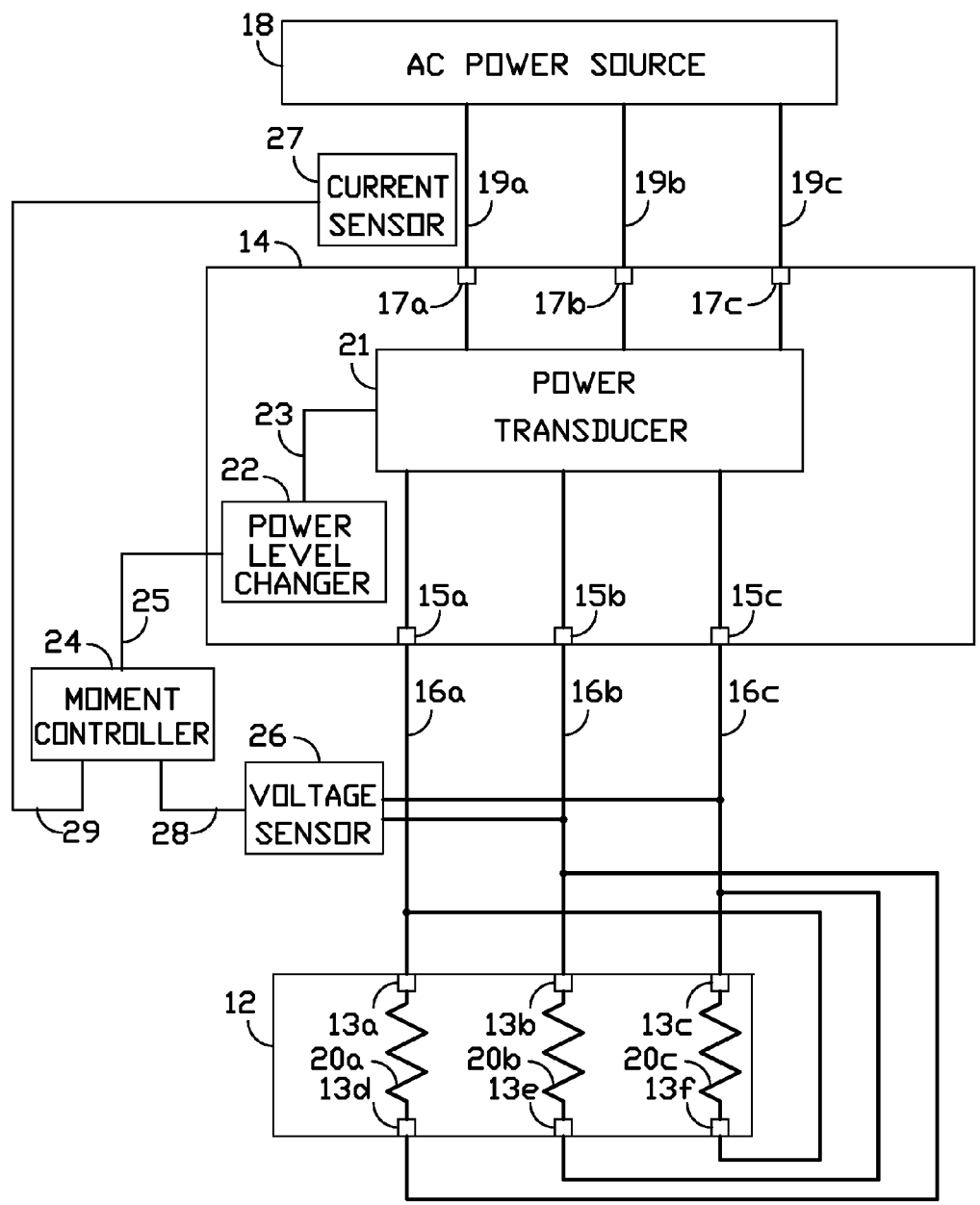

Because of functional dependence of phase voltage and current within delta configuration of motor windings 20a, 20b and 20c and in lines 19a, 19b and 19c, the invention may be used also in this case, FIG. 1D.

The moment controller in some cases may receive information of step voltage changing from another source but voltage sensor, for example, from changer of power level limit 22. In this case, the invention will be used in accordance with FIG. 1D, however, without voltage sensor 26.

Information of voltage step change may be not only result of step power level limit changing by transducer but as result of step changing voltage of AC source. Motor control system will react on last step changing, in accordance with the invention, and correct quality of transient conditions.

Place of motor rotation speed sensor is defined: it is on the motor or on mechanism, which connected to the motor directly.

By the way of example, on FIGS. 2A, 2B, 2C and 2D are shown different preferred embodiments of motor starting-stopping systems with different power controllers. Numbers of positions on FIGS. 2A, 2B, 2C and 2D define the same devices as on FIGS. 1A, 1B, 1C and 1D.

Figure 2A:
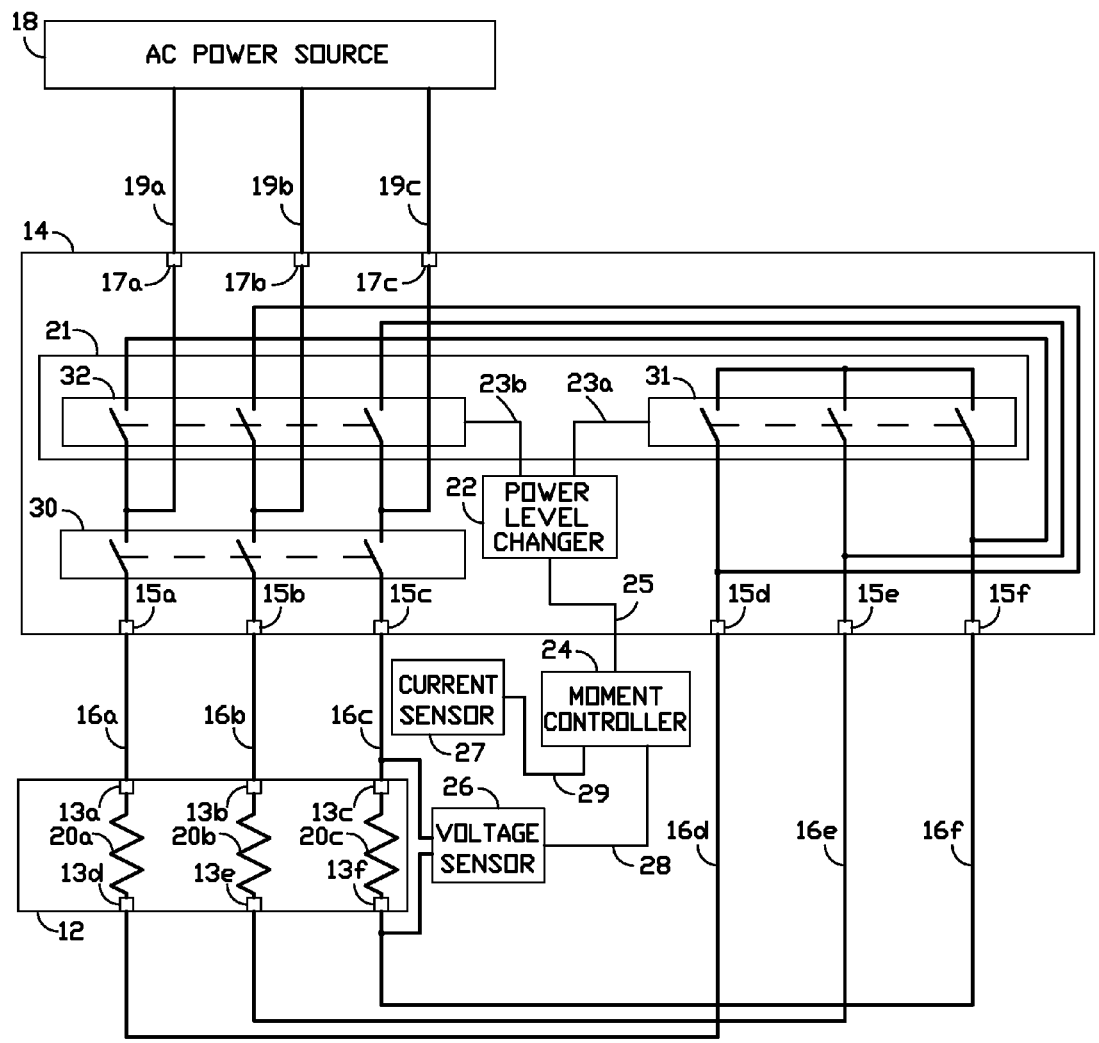
FIGS. 2A, 2B, 2C and 2D are schematic diagrams of motor systems using different constructions of transducer for executing a method of motor starting and stopping, in accordance with the present invention.

On FIG. 2A motor starting system with usual star-delta motor starter is shown as a preferred embodiment. The power controller 14 of the system consists of contactor 30 for connection AC power source to the motor, contactor 31 to produce star configuration of the motor windings and contactor 32 to produce delta configuration of the motor windings. Contactors 31 and 32 works as transducer 21, which change power consumption limit of an AC induction motor three times as a result of changing windings 20a, 20b and 20c from star to delta configuration.

Changer of power level limit 22, which connected by lines 23a, 23b and 23c to coils of contactors 30, 31 and 32 respectively, fulfills opening and closing contactors on base of output signal of moment controller 24.

For example, if the starting of motor 12, connected to AC source 18 by closing contactor 30 when motor windings in star configuration because of closed contactor 31, does not produce breakaway torque, then moment controller 24 produces signal to increase power level limit. Control circuit opens contactor 31 and closes contactor 32 to produce delta configuration of motor windings increasing power level limit three times. As a result, the motor starts with torque, which is in great excess of working torque. Moment controller 24, in accordance with the invention, produces signal to return to previous power level limit by returning to star configuration of the motor windings. And the motor continues starting in star configuration of the motor windings with suitable to working torque power level limit till the transient conditions reach near equilibrium conditions. The method of the invention described here in comparison with traditional star-delta start permits to decrease time of heating unmoved motor with motor windings in star configuration, decreases time of delta configuration of the motor windings, when motor reaches breakaway torque and works with extremely high current, and as a result, makes easier starting process for the motor and electric supply system.

Figure 2B:
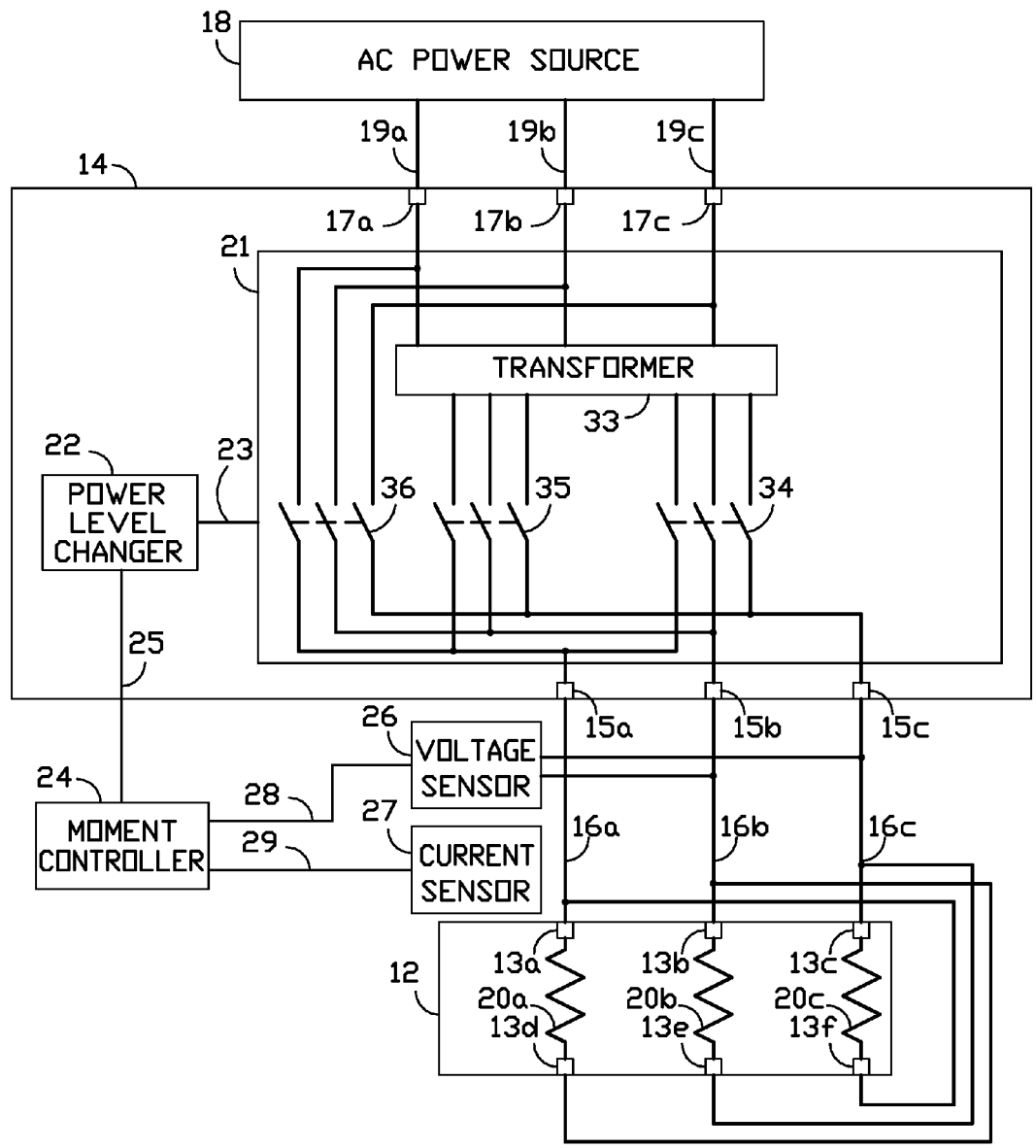

On FIG. 2B auto-transformer motor starting system is shown as a preferred embodiment. Motor 12, which windings 20a, 20b and 20c connect into delta configuration, is connected with wires 16a, 16b and 16c to terminals 15a, 15b and 15c of power controller 14, which consists of electric current transducer 21 and changer of power level limit 22, connected one to another with line 23. Transducer 21 contains three-phase auto-transformer 33, which connects through terminals 17a, 17b, and 17c to AC source 18 and has some output taps. Contactors 34 and 35 connect with one side to the auto-transformer taps. Contactor 36 connects through terminals 17a, 17b and 17c to AC source 18. Contactors 34, 35 and 36 with opposite side through terminals 15a, 15b and 15c connect to motor 12. Changer of power level limit 22 is connected to moment controller 24 by line 25. Moment controller 24 produces signals, which are used by changer of power level limit 22 for open and close contactors 34, 35 and 36, in accordance with the invention.

Figure 2C:
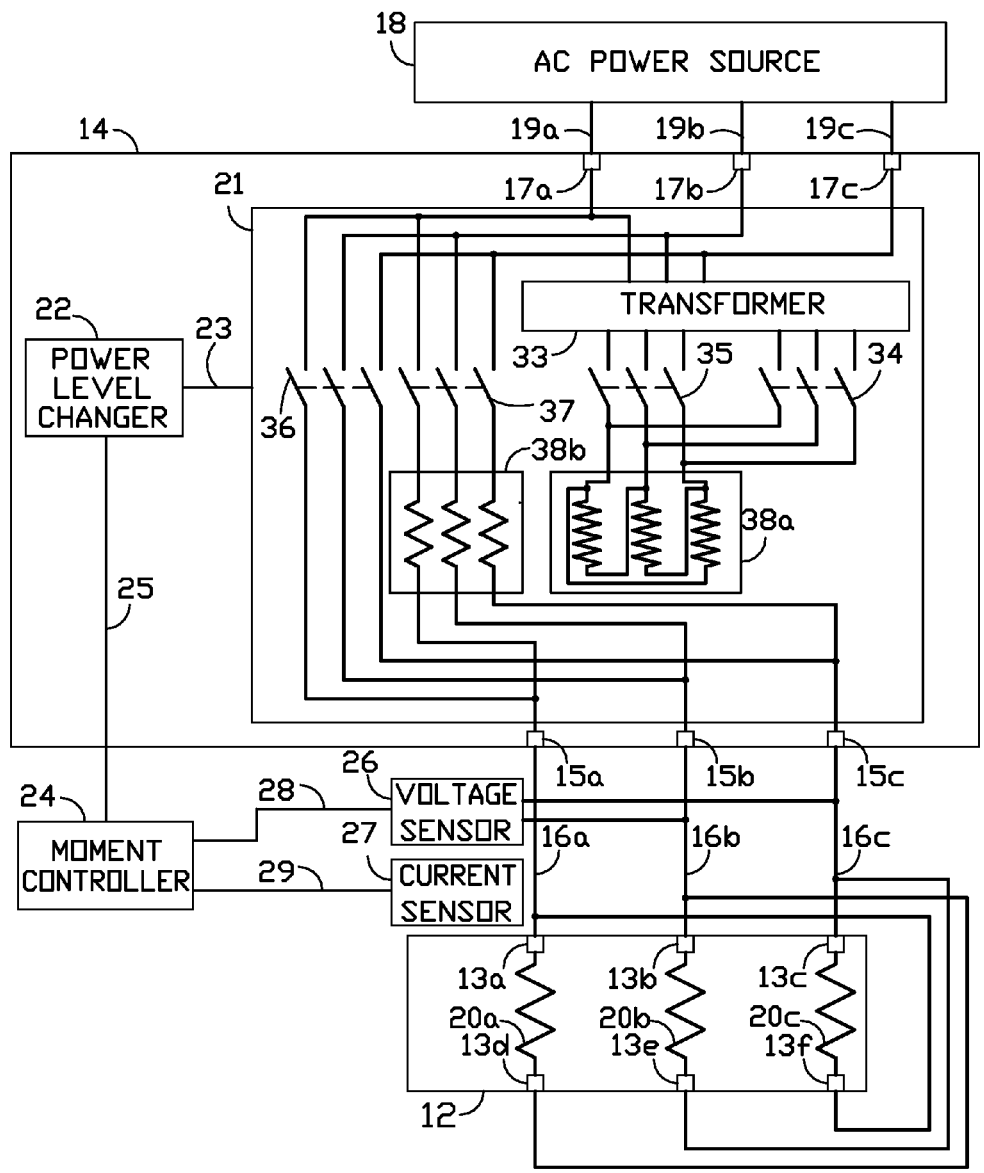

On FIG. 2C auto-transformer motor starting system with additional output transformer is shown as a preferred embodiment. Motor 12, which windings 20a, 20b and 20c connects into delta configuration, is connected with lines 16a, 16b and 16c to terminals 15a, 15b and 15c of power controller 14, which consists of electric current transducer 21 and changer of power level limit 22, connected one to another with line 23. Transducer 21 contains three phase auto-transformer 33 with has some output taps, contactors 34, 35, 36 and 37, and output transformer with primary windings 38a and secondary windings 38b. Auto-transformer 33 connects through terminals 17a, 17b, and 17c to AC source 18 and has some output taps. Contactors 34 and 35 connect with one side to the auto-transformer taps. Contactors 36 and 37 through terminals 17a, 17b, and 17c also connect to AC source. Contactors 34 and 35 with opposite side connect to primary windings 38a of the transformer. Secondary windings 38b of the transformer and contactor 36 through terminals 15a, 15b and 15c connect to motor 12. Output voltage of transformer with windings 38a and 38b, when contactor 37 is closed, depends of input flux of the transformer. It is possible to change input flux of transformer with windings 38a and 38b by selecting which of contactors 34 or 35 will be in closed position. Changer of power level limit 22 is connected to moment controller 24 by line 25. Moment controller 24 produces signals, which is used by changer of power level limit 22 for open and close contactors 34, 35, 36 and 37, in accordance with the invention.

Figure 2D:
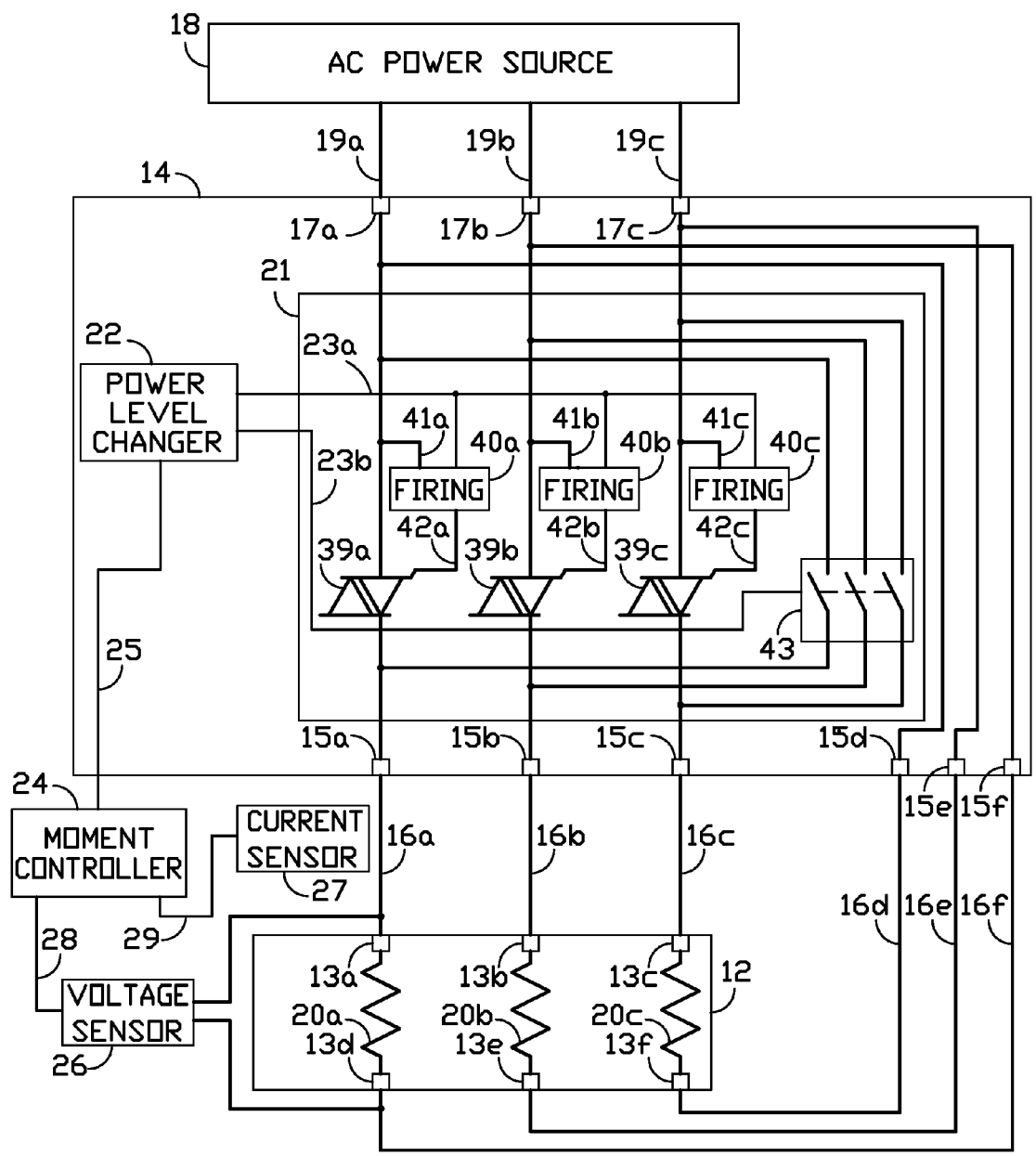

On FIG. 2D motor starting system, including power controller 14, which consists of electric current transducer 21 and changer of power level limit 22, connected one to another with lines 23a and 23b, is shown as a preferred embodiment. Transducer 21 consists of anti-parallel combination of silicon controlled rectifiers (SCRs) or thyristor switches 39a, 39b and 39c; blocks for control of firing angle 40a, 40b and 40c, connected with changer of power level limit 22 by line 23a, with power inputs of thyristor switches 39a, 39b and 39c by lines 41a, 41b and 41c and with control inputs of thyristor switches 39a, 39b and 39c by lines 42a, 42b and 42c; and bypass contactor 43. Coil of contactor 43 connects to changer of power level limit 22 by line 23b. Open power contacts of bypass contactor 43 connect parallel to thyristor switches 39a, 39b and 39c in each phase. Changer of power level limit 22 connects to moment controller 24 by line 25.

Anti-parallel combination of silicon controlled rectifiers (SCRs) or thyristor switches 39a, 39b and 39c connected in series with corresponding windings 20a, 20b and 20c of motor 12, and these couples connected into delta configuration.

Each anti-parallel combination 39a, 39b and 39c is used to change phase voltages V.sub.a, V.sub.b and V.sub.c and phase currents I.sub.a, I.sub.b and I.sub.c through windings 20a, 20b and 20c of motor 12.

Moment controller 24 produces signals, which is used for change magnitude of desired firing angle of the thyristor switches 39a, 39b and 39c or to close contactor 43, in accordance with the invention. Changer of power level limit 22 uses phase control and after receiving signal from moment controller 24 changes firing angle in blocks 40a, 40b and 40c, in accordance with the invention. Blocks 40a, 40b and 40c, after receiving through line 41a, 41b and 41c signal of zero of phase voltage or current, open thyristor switch 39a, 39b and 39c with delay of desired firing angle, alpha or gamma firing angle, using line 42a, 42b and 42c. Power contacts of bypass contactor 43 are closed, when desired firing angle is equal to zero and moment controller 24 produces output signal to increase power level limit, and then motor starting is finished.

FIGS. 3A, 3B, 3C and 3D illustrate changing of voltage across and current through windings and their speeds of change as a function of time during one step of AC induction motor start.

On FIGS. 3A, 3B, 3C and 3D are shown: curve 1—effective voltage, curve 2—effective current, curve 3—speed of change of effective voltage, curve 4—speed of change of effective current. Horizontal lines on curves 3 and 4 are average values of their speeds of changes on selected time interval. Curves 3 and 4 go through middles of the lines.

Figure 3A:
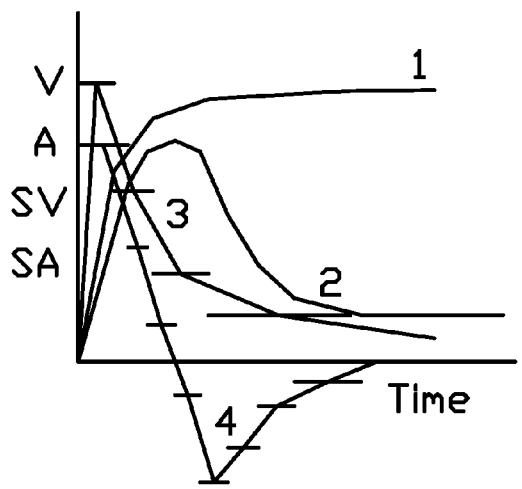
FIGS. 3A, 3B, 3C and 3D are graphical representations of effective voltage across and effective current through motor windings and speeds of change of the voltage and the current as a function of time during one step of AC induction motor start.
Figure 3B:
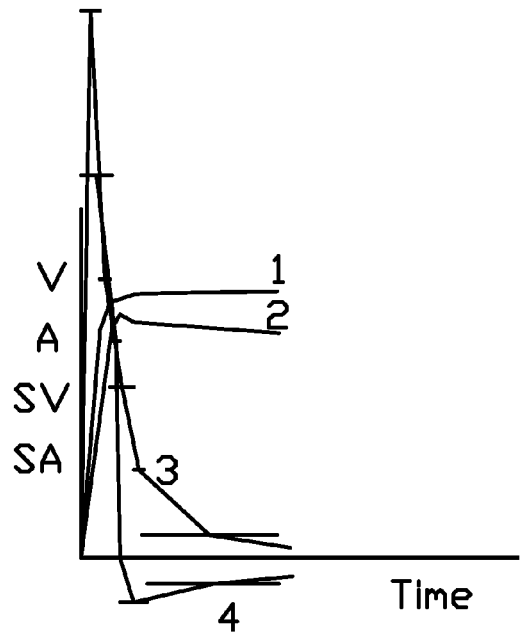
Figure 3C:
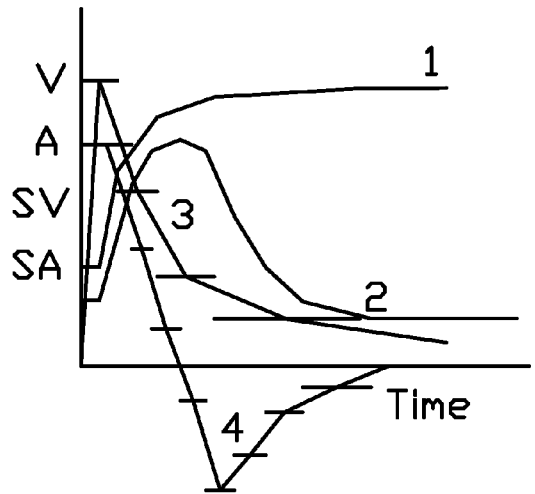
Figure 3D:
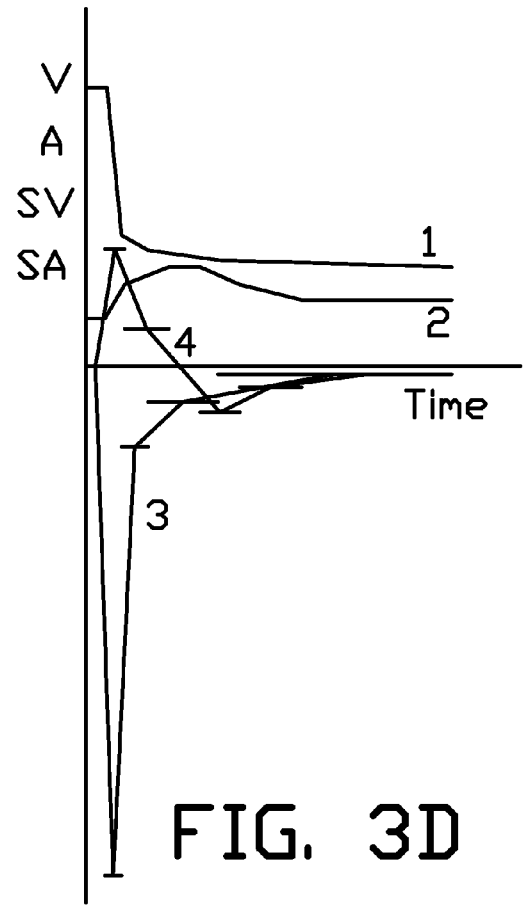

FIG. 3A illustrates usual AC induction motor start, when the motor begins to rotate on first step of the start. FIG. 3B illustrates difficult AC induction motor start, when the motor does not begin to rotate on first step of the start. FIG. 3C illustrates middle step of AC induction motor start by increasing power level limit. FIG. 3D illustrates middle step of AC induction motor start by decreasing power level limit.

It is possible to see in transient process after power level changing that voltage magnitude, curve 1, increases on FIGS. 3A, 3B and 3C or decreases on FIG. 3D smoothly, and absolute value of speed of change of voltage, curve 3, changes from maximum to minimum almost equal to zero. Current, curve 2, in all cases increases to maximum value and then decreases, and speed of change of current, curve 4, changes its magnitude from positive value through zero to minimum value and then increases to zero. Characteristic of current curves are identical in all cases.

This fact allows use common method for definition near equilibrium conditions, characterizing by decreasing of current absolute value and entering of magnitude of speed of change of the current in preset values of near equilibrium conditions. Impermissible transient conditions are characterized with fact that speed of change of current reaches and goes over permissible preset value. When near equilibrium conditions are defined it is necessary to go to next power level limit of start or stop process. When impermissible transition conditions are defined it is necessary to go to previous power level limit of start or stop process.

Figures 4A, 4B, 4C:
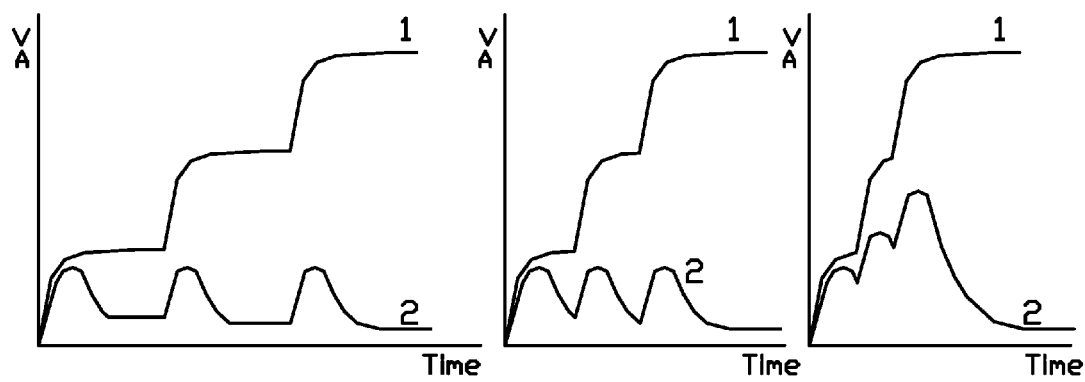
FIGS. 4A, 4B, 4C, 4D, 4E and 4F are graphical representations of effective voltage across and effective current through windings and speeds of change of the voltage and the current as a function of time during three steps AC induction motor usual start, without using and in accordance with the method of the present invention.
Figures 4D, 4E, 4F:
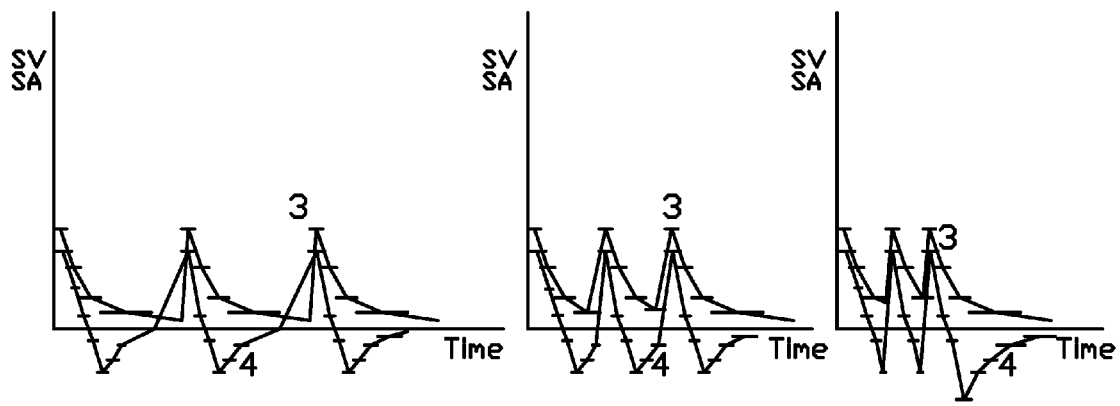

FIGS. 4A, 4B and 4C illustrate changing of voltage across and current through motor windings, and FIGS. 4D, 4E and 4F illustrate speeds of change of the voltage and the current as a function of time during three steps AC induction motor usual starting for one of embodiment of the invention. It is considered three cases of starting: a) intervals of power level limits are longer than in accordance with the invention, FIGS. 4A and 4D, b) intervals of power level limits are in accordance with the invention, FIGS. 4B and 4E, and c) intervals of power level limits are shorter than in accordance with the invention, FIGS. 4C and 4F.

It is possible to see, that start process, fulfilled in accordance with the invention, shown on FIG. 4B, is preferable, than start processes on FIGS. 4A and 4C, because of shorter start time in comparison with start process of FIG. 4A and because of lower current through windings in comparison with start process of FIG. 4C. Almost optimal time intervals between power level limit changing in accordance with the invention permit to fulfill start process with low current in short time.

Drawings on FIGS. 5A, 5B, 5C, 5D, 5E and 5F illustrate changing of voltage across and current through windings and changing of their speeds of change as a function of time during three steps AC induction motor difficult starting for one of embodiment of the invention.

Figures 5A, 5B, 5C:
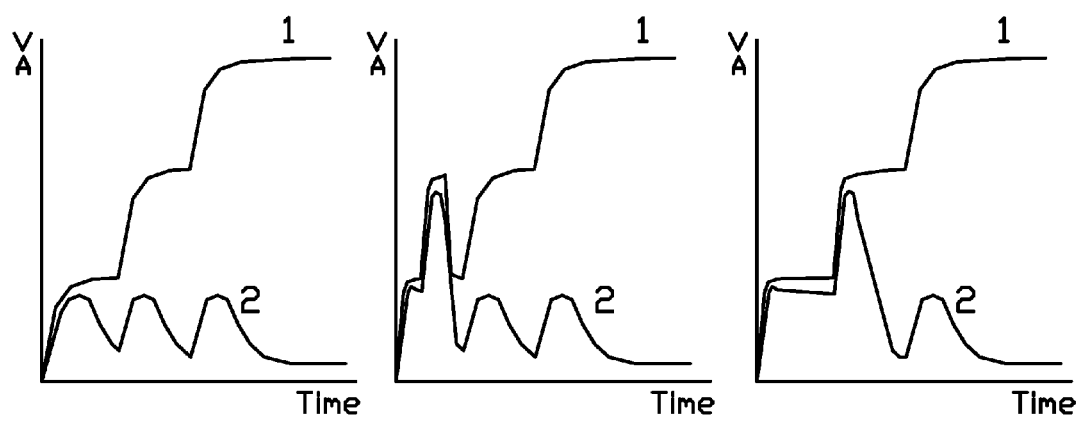

Drawings on FIGS. 5A and 5D are copies of drawings from FIGS. 4B and 4E showing the motor usual starting fulfilled in accordance with the invention. FIGS. 5C and 5F illustrate difficult start process, in which changings of limits of power level fulfill in the same moments as in usual start process shown on FIGS. 5A and 5D. FIGS. 5B and 5E illustrate difficult start process, in which changing of limits of power level is fulfilled in accordance with the method of the invention.

It is possible to see that there is in fulfilled in accordance with the invention usual start process, shown on FIGS. 5A and 5D, and difficult start process, shown on FIGS. 5B and 5E, a difference only on first stage. Second and third stages are identical. Difficult start process, in accordance with the invention, shown on FIGS. 5B and 5E, with regard to process, shown on FIGS. 5C and 5F, has advantages of shorter time period of unmoving motor with current in the motor windings and shorter time period of high magnitudes of the current.

It is possible to conclude from FIGS. 3A-3D, 4A-4F and 5A-5F that changing power level limits during usual and difficult start process on base of information of speeds of change of the voltage and the current gives positive results. Low value of speed of change of the current, even if value of the current is large, shows that power level limit must be increased. Decreasing power level limit for purpose of decreasing current in this case will stop or make slower start process. Decreasing power level limit for decreasing speed of change of effective current will result in lower power level limit more suitable for the motor, which acceleration is greater, then permissible value.

Figure 6A:
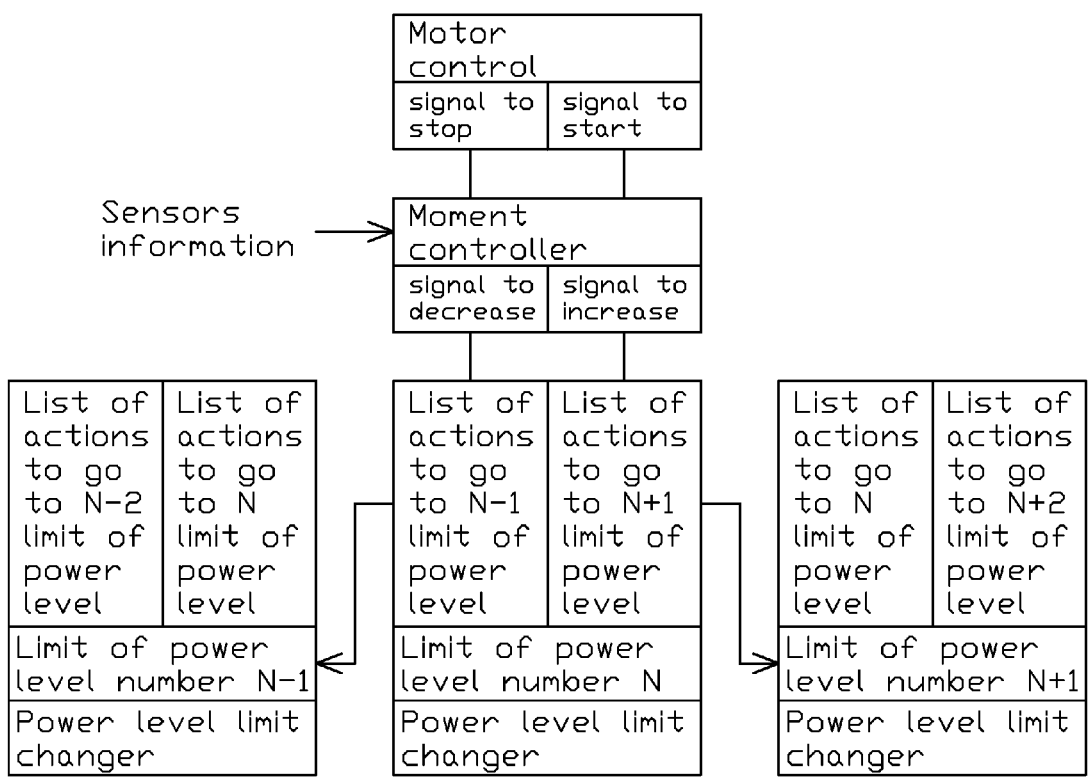
FIGS. 6A, 6B and 6C are block diagrams of working of an algorithm of motor starting and stopping, in accordance with the present invention.
Figure 6B:
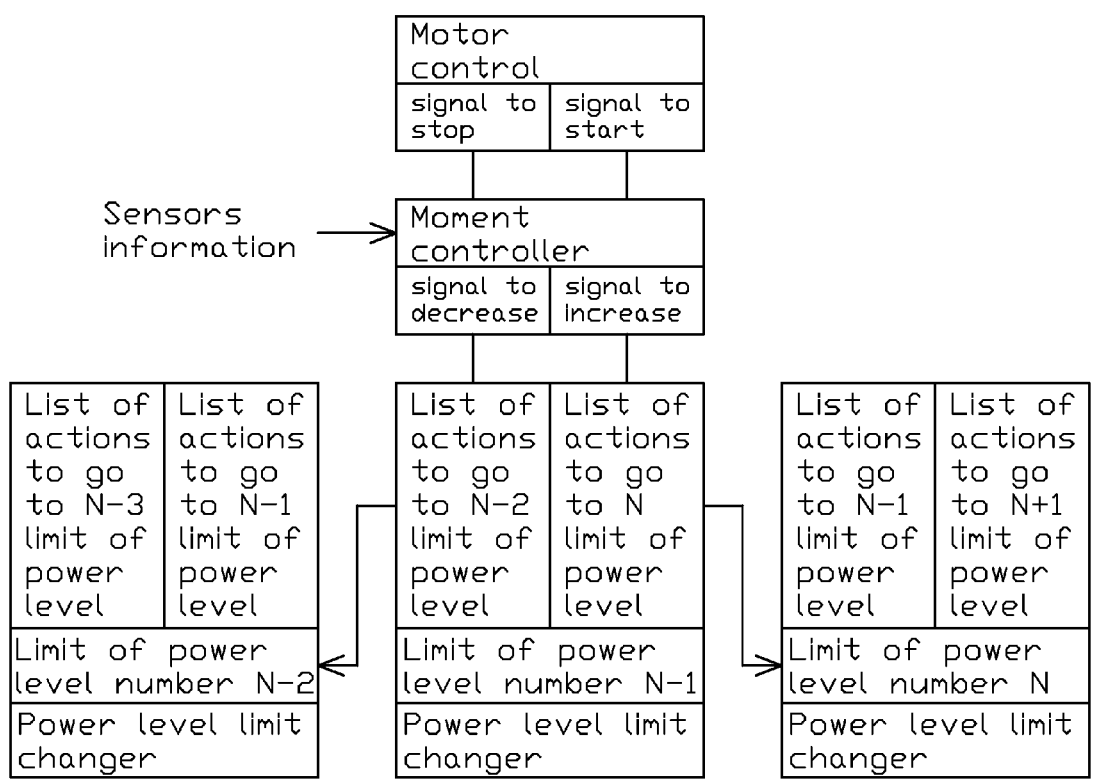
Figure 6C:
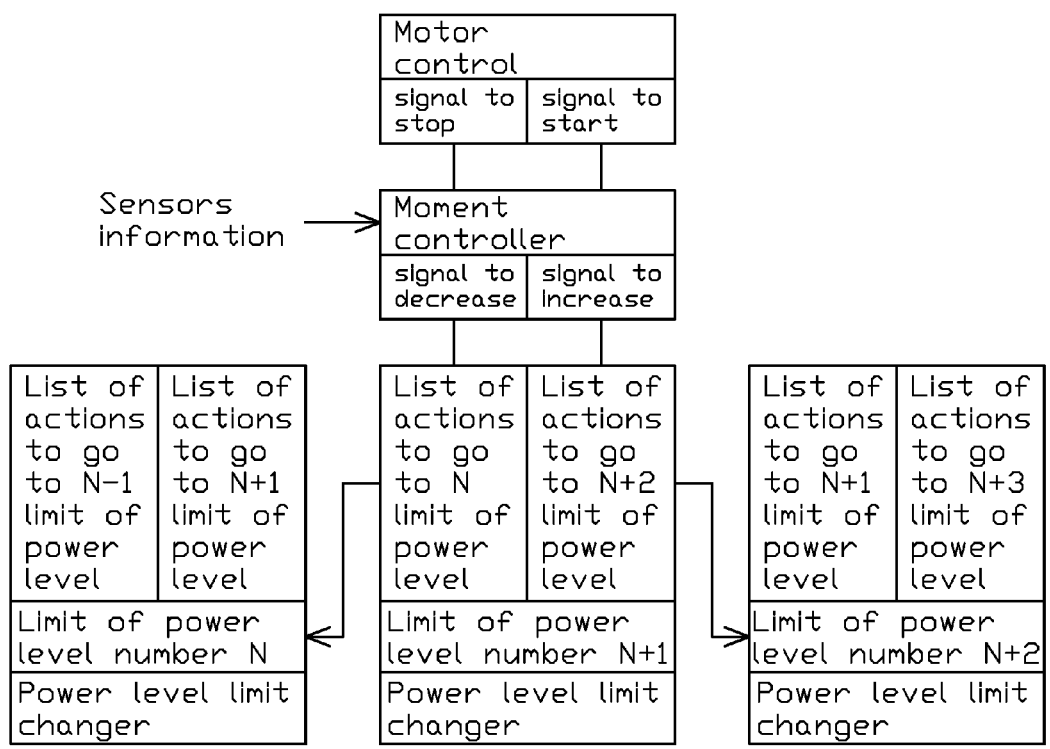

FIGS. 6A, 6B and 6C illustrate working of algorithm of motor starter for one of embodiments of the invention.

FIG. 6A shows interconnection of motor control, moment controller and changer of power level limit before the moment of production of output signal, which the moment controller produces on base of signal of motor control to start or to stop the motor and information of sensors. FIGS. 6B and 6C show interconnection of motor control, moment controller and changer of power level limit after the moment of changing limit of power level. FIG. 6B shows the interconnection, if signal to decrease limit of power level was produced by moment controller. FIG. 6C shows the interconnection, if signal to increase limit of power level was produced by moment controller.

Figure 7:
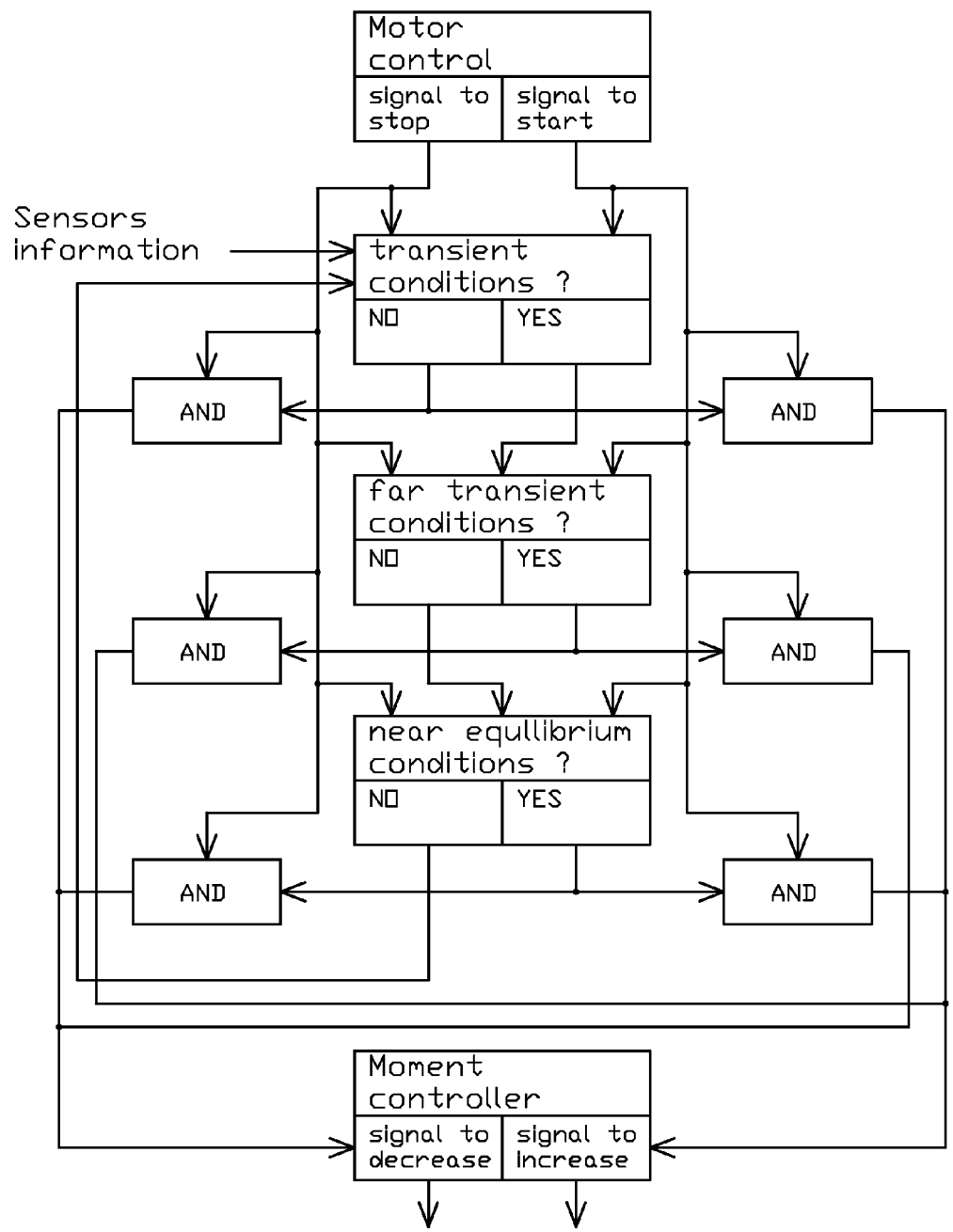
FIG. 7 is a block diagram of a working algorithm of the moment controller, in accordance with the present invention.

FIG. 7 illustrates working of algorithm of moment controller during start or stop process for one embodiment of the invention. Moment controller produces output signal to decrease or to increase power level limit as a function of command of motor control to start or to stop motor, and results of checking motor transient conditions. State of motor without transient conditions is unmoving motor before fulfilling command to start, or motor moving at nominal rotation speed before fulfilling command to stop. Transition conditions are checked for definition near equilibrium conditions or impermissible transient conditions.

Figure 8:
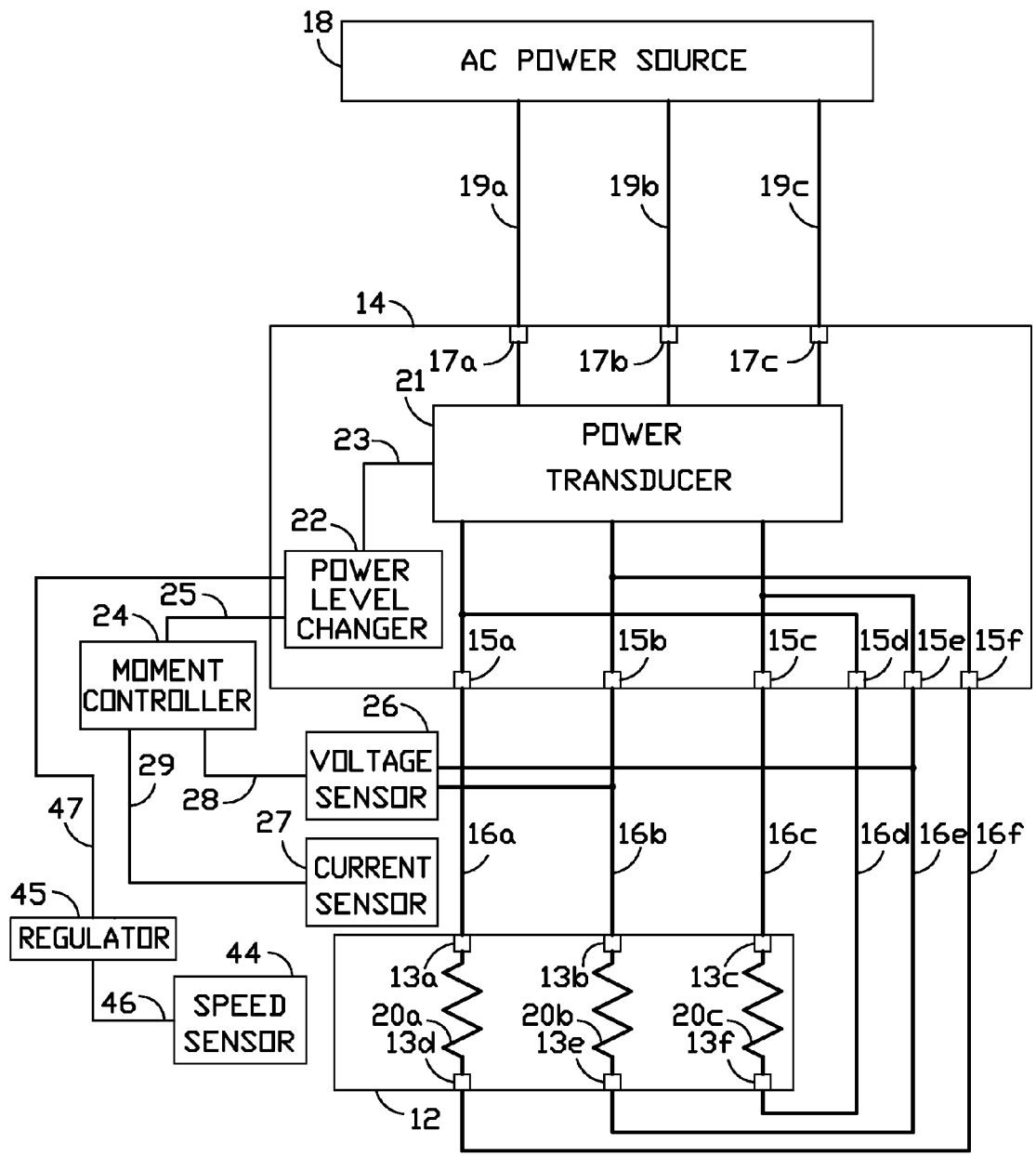
FIG. 8 is a schematic diagram of common motor system for executing a method of motor speed regulation, in accordance with the present invention.

FIG. 8 illustrates realization of method of invention of motor speed regulation with measuring of effective voltage and effective current as another parameter. Numbers of positions on FIG. 8 define the same devices as on FIGS. 1A, 1B, 1C and 1D and FIGS. 2A, 2B, 2C and 2D.

Motor control system includes an AC induction motor 12, which with terminals 13$a$, 13$b$, 13$c$, 13$da$, 13$e$, 13$f$ is coupled to power controller 14, to its output terminals 15$a$, 15$b$, 15$c$, 15$da$, 15$e$, 15$f$, by lines 16$a$, 16$b$, 16$c$, 16$da$, 16$e$, 16$f$. Input terminals 17$a$, 17$b$ and 17$c$ of power controller 14 connected to a three-phase AC source 18 by power supply lines 19$a$, 19$b$ and 19$c$. As it is conventional, AC source 18 provides line voltages V.sub.A, V.sub.B and V.sub.C and line currents I.sub.A, I.sub.B and I.sub.C. The phase voltages V.sub.a, V.sub.b and V.sub.c and phase currents I.sub.a, I.sub.b and I.sub.c through windings 20$a$, 20$b$ and 20$c$ of motor 12 for different power level limits produced by transducer 21. Transducer 21 connected to changer of power level limit 22, which controls transducer 21, by line 23. Changer of power level limit 22 connects to moment controller 24 by line 25. Moment controller 24 controls the moments of power level changes. Moment controller 24 takes information from voltage sensor 26 and current sensor 27 through lines 28 and 29.

Motor speed sensor 44 connects to axis of the motor 12 directly or to a device that connects to the axis of the motor 12 mechanically. Motor speed sensor 44 connects to regulator 45 through line 46. Regulator 45 connects to changer of power level limit 22 through line 47.

Regulator 45 compares on a comparator, included in regulator 45, motor speed from sensor 45 and a preset motor speed and produces, on base of an algorithm control of motor speed, a signal to increase or to decrease power level limit. Changer of power level limit 22 uses the signal to select what process, starting or stopping to fulfill. Changing direction of signal from regulator is used as signal for changing power level limit, if the same signal was not received from moment controller 24 before, during preset time interval. The same signal from moment controller 24 received after signal of changing direction from regulator during preset time interval also does not produce power level limit changing. Thus, it is prevented possibility of double influence of the same transient conditions.

It should be understood that while these functions are described as being implemented in software, it is contemplated that the functions could be implemented in hardware, as well as, the combination of solid state hardware and software, if programmable logic controller or circuit with microprocessor will be used as a control circuit.

It should be also understood that all starters including starter of the above-described embodiments, such as star-delta, autotransformer and soft, may be used for motor speed regulation in accordance with the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention.

Various modes of carrying out the invention are contemplated as being within the scope of the present invention claims particularly pointing out and distinctly claiming the subject matter, which is regarded as the invention.

I claim:

1. A method for controlling an AC induction motor, having at least three windings, on stages starting, speed controlling and stopping by means of a motor starter, which changes by steps power level limits of motor power consumption,
on stage of starting and stopping comprising:
receiving control signal to activate a process selected from: start process of step increasing power level limits, slow stop process of step decreasing power level limits;
fulfilling an initial step of changing power level limits in accordance with received control signal;
measuring a voltage signal;
measuring a signal selected from: speed of the motor rotation, phase effective current through the windings, motor power, said signal is a parameter responsible for changing the now in use power level limit to next power level limit;
comparing said parameter with a preset value of said parameter, said preset value determines selected transition conditions;
producing a power switching signal for changing the now in use power level limit to next power level limit based on result of said comparing;
changing the now in use power level limit to next power level limit, in accordance with said power switching signal; and
executing last four steps until receiving a sign of finishing said process, wherein
composing said parameter by using said signals at a predetermined sequence, so that at least one signal is used for defining a field of the first signal, where a second signal controls conditions for switching power level limit, and said second signal is used for giving off said power switching signal when said second signal is in field of controlling transition conditions.

2. The method of claim 1, wherein
defining speed of change of said voltage on the windings as a field parameter responsible for permitting an examination changing the now in use power level limit to next power level limit;
defining speed of change of said second signal as a switch parameter responsible for changing the now in use power level limit to next power level limit; and
producing said power switching signal by fulfilling next actions:
comparing said field parameter and a preset value of said field parameter;
comparing said switch parameter and a preset value of said switch parameter for said process, if value of said field parameter is in field, where said switch parameter responsible for transition conditions;
giving off said power switching signal, if the value of said switch parameter goes out of values permitted to selected transition conditions;
reiterating said actions until giving off said power switching signal.

3. The method of claim 2, wherein
giving off said power switching signal, which brings power level limit to next in order of the levels for the active process, if said switch parameter decreases in absolute value and goes into preset limits of said switch parameter for the active process.

4. The method of claim 2, wherein
giving off said power switching signal, which brings power level limit to previous in order of the levels for the active process, if negative value of said switch parameter is less than negative preset value of said switch parameter for the active process.

5. The method of claim 2, wherein
comparing absolute values of said field parameter and a preset value of said field parameter; said preset value of said field parameter equals to the production of a predetermined coefficient on initial value of said field parameter.

6. The method of claim 4, wherein
fulfilling the step of said previous power level limit during time interval defined, in accordance with selected transition conditions, and returning to power level limit, which said step was initiated from.

7. A method for controlling an AC induction motor, having at least three windings, on stages starting, speed controlling and stopping by means of a motor starter, which changes by steps power level limits of motor power consumption,
on stage controlling rotation speed of said motor includes:
measuring said rotation speed, comparing values of said measured and a preset rotation speeds, and producing a compensation signal, wherein
initiating a control signal of a process selected from: start process of step increasing power level limits, slow stop process of step decreasing power level limits, in accordance with said compensation signal;
said control signal activates said start process, if said compensation signal increases power level limit, and activates said slow stop process, if said compensation signal decreases power level limit;
fulfilling one step power level limit changing, if previously, in a preset time interval, the same changing of power level limit was not happened; and
fulfilling one step changing of power level limit when said control signal is changed from one process to another, if previously, in a preset time interval, the same changing of power level limit was not happened.

8. A method for controlling an AC induction motor, having at least three windings, on stages starting, speed controlling and stopping by means of a motor starter, which changes by steps power level limits of motor power consumption, wherein comprises:
defining plurality and magnitudes of preset values of parameters needed for achieving selected transition conditions of said motor;
measuring signals needed for determination said parameters,
initiating control signal for alternatively activation of a process selected from: start process of step increasing power level limits, slow stop process of step decreasing power level limits, said processes have said transition conditions, said initiating has been producing manually, by means of remote control, and automatically, in accordance with selected stage and method of control of said motor.

9. The method of claim 8, wherein
executing said activated process by means of:
fulfilling an initial step of changing power level limits, in accordance with said initiated control signal;
fulfilling afterwards changing power level limits step-by-step, where one step includes:
measuring a voltage signal and a signal selected from: speed of the motor rotation, phase effective current through the windings and motor power,
composing a parameter responsible for changing the now in use power level limit to next power level limit and at least one parameter for permitting an examination changing the now in use power level limit to next power level limit,
utilizing at predetermined sequence said parameters for comparing with the preset value of utilized parameter,
producing a power switching signal for changing the now in use power level limit to next power level limit based on result of said comparing, and
changing the now in use power level limit to next power level limit according to said power switching signal; and
executing changing of steps until receiving a sign of finishing said activated process.

10. The method of claim 9, wherein
defining speed of change of the effective voltage on the windings as a field parameter responsible for permitting an examination for changing the now in use power level limit to next power level limit;
defining speed of change of said selected signal as a switch parameter responsible for changing the now in use power level limit to next power level limit; and
producing said power switching signal fulfilling next actions:
comparing said field parameter and the preset value of said field parameter;
comparing said switch parameter and the preset value of said switch parameter for the process fulfilled in accordance with said initiated control signal, if value of said field parameter is in field, where said switch parameter responsible for transition conditions;
giving off said power switching signal, if the value of said switch parameter goes out of values permitted, in accordance with selected transition conditions; and
reiterating said actions until giving off said power switching signal.

11. The method of claims 10, wherein
giving off said power switching signal, which brings power level limit to next in order of the levels for the active process, if said switch parameter decreases in absolute value and goes into the preset limits of said switch parameter for the active process.

12. The method of claim 10, wherein
giving off said power switching signal, which brings power level limit to previous in order of the levels for the active process, if negative value of said switch parameter is less than the negative preset value of said switch parameter for the active process.

13. The method of claim 10, wherein
comparing said field parameter and the preset value of said field parameter fulfills between absolute values of said field parameter and the preset value of said field parameter, where the preset value of said field parameter equals to the production of a predetermined coefficient on initial value of said field parameter.

14. The method of claim 12, wherein
fulfilling the step of said previous power level limit during time interval defined, in accordance with selected transition conditions, and returning to power level limit, which said step was initiated from.

15. The method of claim 8, wherein
fulfilling one step changing of power level limit when said control signal is changed from one process to another, if previously, in a preset time interval, the same changing of power level limit was not happened.

16. The method of claim 8, wherein
fulfilling one step changing of power level limit on initiating control signal, if previously, in a preset time interval, the same changing of power level limit was not happened.

* * * * *